(12) United States Patent
Shi et al.

(10) Patent No.: US 12,150,126 B2
(45) Date of Patent: Nov. 19, 2024

(54) METHOD AND TERMINAL EQUIPMENT FOR HARQ FEEDBACK

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Jing Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 350 days.

(21) Appl. No.: 17/541,268

(22) Filed: Dec. 3, 2021

(65) Prior Publication Data
US 2022/0095344 A1 Mar. 24, 2022

Related U.S. Application Data

(63) Continuation of application No. PCT/CN2019/109161, filed on Sep. 29, 2019.

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01); *H04W 72/23* (2023.01)

(58) Field of Classification Search
None
See application file for complete search history.

(56) References Cited

U.S. PATENT DOCUMENTS

2019/0103947 A1 4/2019 Park
2021/0314095 A1* 10/2021 Gao .................. H04L 1/1812
(Continued)

FOREIGN PATENT DOCUMENTS

CN 106664729 5/2017

OTHER PUBLICATIONS

CATT, "Remaining issues on HARQ-ACK codebook", 3GPP TSG RAN WG1 Meeting #93, R1-1806301, May 21-25, 2018, pp. 1-7.
(Continued)

*Primary Examiner* — Lonnie V Sweet
(74) *Attorney, Agent, or Firm* — JCIP GLOBAL INC.

(57) ABSTRACT

The embodiments of the application disclose a method and terminal equipment for HARQ feedback. The method includes steps as follows. The terminal equipment determines a semi-static HARQ-ACK codebook according to a candidate transmission occasion. The semi-static HARQ-ACK codebook is used to indicate the feedback information corresponding to the candidate transmission occasion, the candidate transmission occasion comprises a transmission occasion scheduled by a DCI and/or a transmission occasion of a PDSCH scheduled by a SPS, and the transmission occasion scheduled by the DCI comprises a transmission occasion of the PDSCH scheduled by the DCI and/or a transmission occasion corresponding to SPS PDSCH deactivation information scheduled by the DCI. The terminal equipment performs HARQ feedback according to the semi-static HARQ-ACK codebook. The method and terminal equipment of the embodiments of the application can determine the semi-static HARQ-ACK codebook and accordingly perform feedback.

14 Claims, 5 Drawing Sheets

(51) Int. Cl.
*H04L 5/00* (2006.01)
*H04W 72/23* (2023.01)

(56) References Cited

U.S. PATENT DOCUMENTS

| | | | |
|---|---|---|---|
| 2022/0209901 A1* | 6/2022 | Lei | H04L 1/1858 |
| 2022/0239445 A1* | 7/2022 | Yoshioka | H04L 5/0055 |
| 2022/0240228 A1* | 7/2022 | Matsumura | H04L 1/1861 |

OTHER PUBLICATIONS

Spreadtrum Communications, "Remaining issues on HARQ-ACK codebook", 3GPP TSG RAN WG1 Meeting #92b, R1-1804227, Apr. 16-20, 2018, pp. 1-10.

"International Search Report (Form PCT/ISA/210) of PCT/CN2019/109161", mailed on Jun. 24, 2020, with English translation thereof, pp. 1-6.

"Written Opinion of the International Searching Authority (Form PCT/ISA/237) of PCT/CN2019/109161", mailed on Jun. 24, 2020, with English translation thereof, pp. 1-6.

* cited by examiner

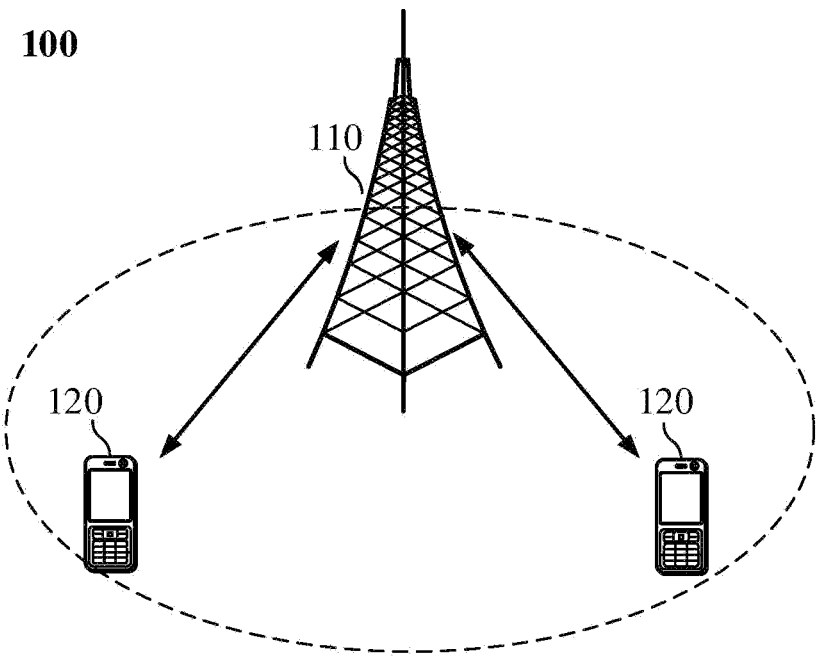

FIG. 1

200 — The terminal equipment determines the semi-static hybrid automatic repeat request acknowledgement (HARQ-ACK) codebook according to the candidate transmission occasion, the semi-static HARQ-ACK codebook is used to indicate the feedback information corresponding to the candidate transmission occasion, the candidate transmission occasion includes the transmission occasion scheduled by the downlink control information DCI and/or the transmission occasion of the PDSCH scheduled by the semi-persistent scheduling SPS, and the transmission occasion scheduled by the DCI includes the transmission occasion of the PDSCH scheduled by the DCI and/or the transmission occasion corresponding to the SPS PDSCH deactivation information scheduled by the DCI. ~ S210

The terminal equipment performs HARQ feedback according to the semi-static HARQ-ACK codebook. ~ S220

FIG. 2

METHOD AND TERMINAL EQUIPMENT FOR HARQ FEEDBACK

CROSS-REFERENCE TO RELATED APPLICATION

This application is a continuation of international PCT application serial no. PCT/CN2019/109161, filed on Sep. 29, 2019. The entirety of the above-mentioned patent application is hereby incorporated by reference herein and made a part of this specification.

BACKGROUND

Technology Field

The embodiments of the application relate to the field of communications, and more specifically, to a method and terminal equipment for hybrid automatic repeat request (HARQ) feedback.

Description of Related Art

To improve transmission reliability, for downlink data, the network requires a certain way of information to know whether the terminal correctly detects (decodes or receives) the downlink data. This process is called HARQ feedback. HARQ feedback information includes acknowledgement (ACK)/negative acknowledgement (NACK). One or more ACK/NACK bits form a HARQ-ACK codebook. HARQ-ACK codebooks are generally divided into two types: semi-static (semi-static) HARQ-ACK codebooks and dynamic (dynamic) HARQ-ACK codebooks.

To allow the terminal and the network to understand in the same way, which HARQ-ACK bits are included in a semi-static HARQ-ACK codebook and the order in the codebook needs to be clear, that is, how to determine the semi-static HARQ-ACK codebook needs to be clear.

SUMMARY

The embodiments of the application provide a method and terminal equipment for HARQ feedback capable of determining a semi-static HARQ-ACK codebook and accordingly performing feedback.

For the first aspect, a HARQ feedback method is provided. The method includes steps as follows. The terminal equipment determines a semi-static hybrid automatic repeat request acknowledgement (HARQ-ACK) codebook according to a candidate transmission occasion. The semi-static HARQ-ACK codebook is used to indicate the feedback information corresponding to the candidate transmission occasion, the candidate transmission occasion comprises a transmission occasion scheduled by a downlink control information (DCI) and/or a transmission occasion of a physical downlink shared channel (PDSCH) scheduled by a semi-persistent scheduling (SPS), and the transmission occasion scheduled by the DCI comprises a transmission occasion of the PDSCH scheduled by the DCI and/or a transmission occasion corresponding to SPS PDSCH deactivation information scheduled by the DCI. The terminal equipment performs HARQ feedback according to the semi-static HARQ-ACK codebook.

For the second aspect, a terminal equipment is provided for executing the method illustrated in the first aspect or in its implementation manner.

Specifically, the terminal equipment includes a functional module for executing the method the method illustrated in the first aspect or in its implementation manner.

For the third aspect, a terminal equipment is provided. The terminal equipment includes a processor and memory. The memory is used to store a computer program, and the processor is used to call and run the computer program stored in the memory and execute the method illustrated in the first aspect or in its implementation manner.

For the fourth aspect, a chip is provided, which is used to implement the method illustrated in the first aspect or in its implementation manner.

Specifically, the chip includes a processor configured to call and run a computer program from memory, so that a device disposed with the chip executes the method illustrated in the first aspect or in its implementation manner.

For the fifth aspect, a computer-readable storage medium is provided for storing a computer program that enables a computer to execute the method illustrated in the first aspect or in its implementation manner.

For the sixth aspect, a computer program product is provided. The computer program product includes computer program instructions which enable a computer to execute the method illustrated in the first aspect or in its implementation manner.

For the seventh aspect, a computer program is provided. When running on a computer, the computer program enables a computer to execute the method illustrated in the first aspect or in its implementation manner.

Through the technical solution, the semi-static HARQ-ACK codebook is determined according to the candidate transmission occasion, and feedback is performed according to the determined semi-static HARQ-ACK codebook, the candidate transmission occasion includes the transmission occasion scheduled by downlink control information (DCI) and/or the transmission occasion of physical downlink shared channel (PDSCH) scheduled by semi-persistent scheduling (SPS). The technical solution of the application takes into account the possibility of various transmission occasions, which contributes to improving the performance of feedback.

The aspects and other aspects of the application may be more clearly and easily understood through the description of the embodiments as follows.

BRIEF DESCRIPTION OF THE DRAWINGS

FIG. 1 is a schematic view of a communication system architecture according to an embodiment of the application.

FIG. 2 is a schematic block view of a method for HARQ feedback according to an embodiment of the application.

DESCRIPTION OF THE EMBODIMENTS

Figure 3:
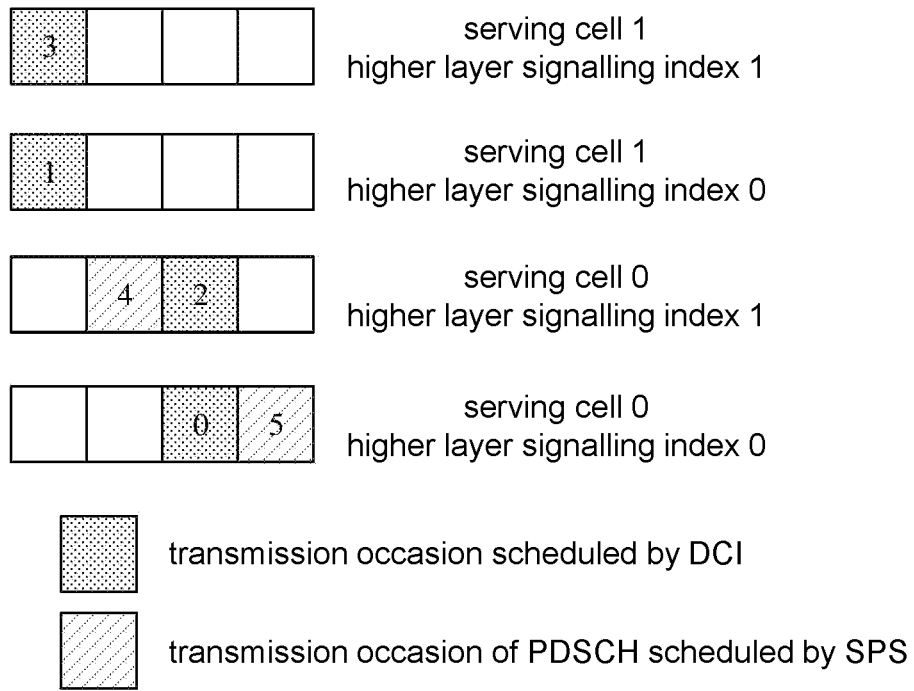
FIG. 3 is a schematic view illustrating an order of feedback information in a semi-static HARQ-ACK codebook according to an embodiment of the application.

The technical solutions in the embodiments of the application are illustrated below with reference to the drawings in the embodiments of the application. Obviously, the illustrated embodiments are a part of the embodiments of the application but not all of the embodiments. According to the embodiments in the application, all other embodiments obtained by those ordinary skill in the art without creative work shall fall within the protection scope of the application.

It should be understood that the technical solutions of the embodiments of the application can be applied to various communication systems, such as Global System for Mobile (GSM) system, code division multiple access (CDMA) system, wideband code division multiple access (WCDMA) system, general packet radio service (GPRS), Long Term Evolution (LTE) system, LTE frequency division duplex (FDD) system, LTE time division duplex (TDD), universal Mobile Telecommunication System (UMTS), worldwide interoperability for microwave access (WiMAX) communication system, new radio (NR), the future 5G system, or the like.

Specifically, the technical solutions of the embodiments of the application can be applied to various communication systems according to non-orthogonal multiple access techniques, such as sparse code multiple access (SCMA) system, low density signature (LDS) system, and the like. The SCMA system and LDS system can also refer to other names in the communication field; furthermore, the technical solutions of the embodiments of the application can be applied to a multi-carrier transmission system using non-orthogonal multiple access techniques, such as orthogonal frequency division multiplexing (OFDM) system using non-orthogonal multiple access techniques, filter bank multi-carrier (FBMC) system, generalized FDM (GFDM) system, filtered-OFDM (F-OFDM) system, and the like.

For illustration, a communication system 100 applied in the embodiment of the application is shown in FIG. 1. The communication system 100 may include network equipment 110, and the network equipment 110 may be equipment that communicates with terminal equipment 120 (or referred to a communication terminal or a terminal). The network equipment 110 may provide communication coverage for a specific geographic area and may communicate with terminal equipment located in the coverage area. Optionally, the network equipment 110 may be a base transceiver station (BTS) in a GSM system or a CDMA system, also a NodeB (NB) in a WCDMA system, an evolutional Node B, eNB or eNodeB in an LTE system, or a wireless controller in a cloud radio access network (CRAN); or the network equipment can be a mobile switching center, relay station, access point, vehicle-mounted device, wearable device, hub, switch, bridge, router, network equipment gNB in a 5G network, or network equipment in the future evolution of the public land mobile network (PLMN), and the like.

The communication system 100 also includes at least one terminal equipment 120 disposed within the coverage area of the network equipment 110. "Terminal equipment" as used herein includes, but is not limited to, user equipment (UE), an access terminal, a user unit, a user station, a mobile station, a mobile platform, a remote station, a remote terminal, mobile equipment, a user terminal, a terminal, wireless communication equipment, a user agent, or a user device. The access terminal can be a cellular phone, a cordless phone, a session initiation protocol (SIP) phone, a wireless local loop (WLL) station, a personal digital assistant (PDA), a handheld device with wireless communication function, computing equipment, other processing equipment connected to a wireless modem, car equipment, wearable device, terminal equipment in the future 5G network, terminal equipment in the future evolution of the public land mobile network (PLMN), or the like. The embodiment of the invention is not limited thereto.

Optionally, device to device (D2D) terminal communication may be performed between the terminal equipment 120.

Optionally, the 5G system or 5G network may also be referred to as a new radio (NR) system or a NR network.

FIG. 1 illustrates one network equipment 110 and two terminal equipments 120. Optionally, the communication system 100 may include multiple network equipment 110 and the coverage of each network equipment 110 may include terminal equipment 120 in other quantities, which is not limited in the embodiment.

Optionally, the communication system 100 may also include other network entities such as a network controller, a mobility management entity, and the like, which is not limited in the embodiment of the application.

It should be understood that equipment with a communication function in the network/system in the embodiment of the application may be referred to as communication equipment. Taking the communication system 100 shown in FIG. 1 as an example, the communication equipment may include the network equipment 110 and the terminal equipment 120 with communication functions, and the network equipment 110 and the terminal equipment 120 may be the specific equipment described above, which is not iterated herein; the communication equipment may also include other equipment in the communication system 100, such as a mobility management entity (MME), a serving gateway (S-GW), a PDN gateway (P-GW), or the like, which is not limited in the embodiments of the application.

Before introducing the embodiments of the application, some related technologies are introduced first.

1. Multi-Beam System

The design goals of the NR/5G system include large-bandwidth communications in high frequency bands (e.g., frequency bands above 6 GHz). When the operating frequency becomes higher, the path loss during transmission may increase, thereby affecting the coverage capability of the high-frequency system. To effectively ensure the coverage of the high-frequency NR system, an effective technical solution is adopting the multi-beam technology according to a large-scale antenna array to improve the coverage.

In the conventional, typical 2/3/4G system, a cell (sector) uses a wider beam to cover the entire cell. Therefore, at every moment, the UE within the coverage of the cell has an opportunity to obtain the transmission resources allocated by the system.

The NR/5G multi-beam system uses different beams to cover the entire cell, that is, each beam covers a small area, and the effect of multiple beams covering the entire cell is implemented through sweeping in time. Currently, different beams carry different signals and are identified by the different signals.

Different synchronizing signal blocks (SS blocks) are transmitted by some different beams, and the UE can distinguish the different beams through the different SS blocks;

Different channel state information reference signals (CSI-RSs) are transmitted by some different beams, and the UE identifies the different beams through the CSI-RSs/CSI-RS resources.

In a multi-beam system, a physical downlink control channel (PDCCH) and a physical downlink shared channel (PDSCH) can be transmitted through different downlink transmission beams. For systems below 6G, generally there is no analog beam on the UE side, so an omnidirectional antenna (or an antenna close to omnidirectional) is used to receive signals sent by different downlink transmission beams of the base station. For a millimeter wave system, there may be an analog beam on the UE side, and the corresponding downlink receiving beam is required to receive the signal sent by the corresponding downlink transmission beam. Meanwhile, corresponding beam indication information is required to assist the UE in determining the related information of the transmission beam on the network side or the related information of the corresponding receiving beam on the UE side.

2. Multiple Transmission/Reception Point (TRPs)/Panel/Beam Transmission

In the current NR/5G discussion, the solution of multiple TRPs, multiple antenna panels, or multiple beams simultaneously transmitting downlink data to the UE supports the following two types of solutions:

1. The UE detects only one NR-PDCCH, and a DCI detected by the PDCCH indicates relevant indication information of data transmitted simultaneously on multiple TRPs/panel/beams. For example, the transmission on different TRPs/panels/beams can be implicitly indicated through different quasi co-location (QCL) information.
2. The UE receives different NR-PDCCHs from different TRPs/panels/beams, and the DCI detected on each of the PDCCH indicates relevant indication information of corresponding data transmission.

For the first solution, the UE only needs to detect one NR-PDCCH, so the control channel detection complexity may be lower than that of the second solution. The first solution requires quick information exchange among different panels/TRPs/beams.

For the second solution, the UE needs to detect all multiple NR-PDCCHs on the same carrier. The complexity may increase, but the flexibility and robustness may be improved.

The possible application scenarios of the second solution are at least as follows.

1. Multiple TRPs belong to the same cell, and the backhaul between TRPs is ideal (i.e., rapid information exchange and dynamic information exchange can be carried out).
2. Multiple TRPs belong to the same cell, and the backhaul between TRPs is not ideal (i.e., TRPs cannot exchange information quickly and can only exchange data relatively slowly).
3. Multiple TRPs belong to different cells, and the backhaul between TRPs is ideal.
4. Multiple TRPs belong to different cells, and the backhaul between TRPs is not ideal.

If the TRPs are replaced by beams, then four multi-beam application scenarios can be obtained correspondingly.

Since all multiple PDCCHs need to be detected on the same carrier, in Rel-16, it is possible to distinguish different PDCCHs from different TRPs/panels/beams in an implicit way. For example, the control resource set (CORESET) can be mapped to a higher layer signalling index, one higher layer signalling index can correspond to multiple CORESETs, and each higher layer signalling index can be considered as corresponding to one TRP. That is, one or more CORESETs corresponding to one higher layer signalling index all correspond to the same TRP.

For example, if 5 CORESETs are disposed on a certain carrier (or bandwidth part (BWP)), CORESET 0, CORESET 1, and CORESET 2 correspond to the higher layer signalling index 0, and CORESET 3 and CORESET 4 correspond to the higher layer signalling index 1. The PDCCHs corresponding to CORESET 0, CORESET 1, and CORESET 2 are all sent from TRP 0, and the PDCCHs corresponding to CORESET 3 and CORESET 4 are all sent from TRP 1.

3. HARQ Feedback

Regarding the downlink data, whether the receiving end (e.g., UE) has correctly detected (herein the meaning is the same as decoding and receiving meaning) the downlink data, a certain way of information is required to inform the sender (e.g., the base station), this information is generally called HARQ-ACK information and can also be called ACK/NACK. Correspondingly, one or more HARQ-ACK bits (or ACK/NACK bits for short) form the HARQ-ACK codebook. In NR Rel-15, there are two types of HARQ-ACK codebooks: semi-static HARQ-ACK codebook and dynamic HARQ-ACK codebook.

To make the sender and receiver understand the same, it needs to know which HARQ-ACK bits are included in a semi-static HARQ-ACK codebook and the order in the codebook, that is, it needs to be sure how to determine the semi-static HARQ-ACK codebook.

Therefore, the embodiment of the application provides a HARQ feedback method, which can determine the semi-static HARQ-ACK codebook and accordingly perform feedback.

FIG. 2 is a schematic block view of a HARQ feedback method 200 according to an embodiment of the application. As shown in FIG. 2, the method 200 includes some or all of the contents as follows.

S210: The terminal equipment determines the semi-static hybrid automatic repeat request acknowledgement (HARQ-ACK) codebook according to the candidate transmission occasion, the semi-static HARQ-ACK codebook is used to indicate the feedback information corresponding to the candidate transmission occasion, the candidate transmission occasion includes the transmission occasion scheduled by the downlink control information DCI and/or the transmission occasion of the physical downlink shared channel PDSCH scheduled by the semi-persistent scheduling SPS, the transmission occasion scheduled by the DCI includes the transmission occasion of the PDSCH scheduled by the DCI and/or the transmission occasion corresponding to the SPS PDSCH deactivation information scheduled by the DCI.

S220: The terminal equipment performs HARQ feedback according to the semi-static HARQ-ACK codebook.

Specifically, transmission occasion can be understood as transmission resources, including frequency domain resources and/or time domain resources. The candidate transmission occasion can understand the resources that may be used to transmit data or signaling that are allocated, or configured, or predefined by the network for the terminal equipment. The transmission occasion of PDSCH scheduled by DCI refers to the transmission resources of PDSCH that may be dynamically scheduled by DCI, the transmission occasion of PDSCH scheduled by SPS (also called SPS PDSCH transmission occasion) refers to the transmission resources of the PDSCH semi-persistently scheduled by SPS, the transmission occasion corresponding to the SPS PDSCH deactivation information scheduled by DCI refers to the transmission resources that may be used to transmit the SPS PDSCH deactivation information, and after the terminal equipment detects the SPS PDSCH deactivation information, the PDSCH scheduled by the SPS may no longer be transmitted. Specifically, the candidate transmission occasion may include at least one of the transmission occasions of the PDSCH scheduled by the DCI, the transmission occasion of the PDSCH scheduled by the SPS, and the transmission occasion corresponding to the SPS PDSCH deactivation information scheduled by the DCI. That is, the candidate transmission occasion herein may only include any one of the three transmission occasions, may also include any two of the three transmission occasions, or may include the three transmission occasions. The terminal equipment can determine the semi-static HARQ-ACK codebook according to the candidate transmission occasion, and the semi-static HARQ-ACK codebook can be used to indicate the feedback information corresponding to these candidate transmission occasions, that is, the semi-static HARQ-ACK codebook includes feedback information corresponding to each candidate transmission occasion. The feedback information may be the HARQ-ACK information, which includes corresponding HARQ-ACK information bits. The terminal equipment may determine the content included in the semi-static HARQ-ACK codebook according to the candidate transmission occasion, or the terminal equipment may also determine the order of each feedback information in the semi-static HARQ-ACK codebook according to the candidate transmission occasion. After determining and generating the semi-static HARQ-ACK codebook, the terminal equipment can feed back the semi-static HARQ-ACK codebook to the network. For example, if the terminal equipment detects the SPS PDSCH deactivation information on the transmission occasion corresponding to the SPS PDSCH deactivation information scheduled by DCI or the terminal equipment receives the transmission block on the transmission occasion of the PDSCH (including the transmission occasion of the PDSCH scheduled by DCI and/or the transmission occasion of the PDSCH scheduled by SPS), the terminal equipment generates a corresponding acknowledgement (ACK); or if the terminal equipment does not correctly receive the transmission block on the transmission occasion of the PDSCH (including the transmission occasion of the PDSCH scheduled by the DCI and/or the transmission occasion of the PDSCH scheduled by the SPS), the terminal equipment generates a corresponding negative acknowledgement (NACK).

Optionally, in the embodiment of the application, the candidate transmission occasion corresponds to one or more higher layer signalling indexes. For example, a higher layer signalling index can correspond to a TRP/panel/beam. The higher layer signalling index can be understood as a TRP. In addition, a higher layer signalling index can correspond to at least one CORESET. A higher layer signalling index can also correspond to a group of CORESET, or in other words, a higher layer signalling index is a group of CORESET group numbers. The higher layer signalling index can be carried in the CORESET configuration signaling. Note that the higher layer signalling index is only a name, other names are not excluded, and the embodiment of the application is not limited thereto.

The value of the higher layer signalling index generally starts from 0, that is, the value is 0, 1, ... N−1, and typically, N=2.

Optionally, the terminal equipment may determine the type of the HARQ-ACK codebook as a semi-static HARQ-ACK codebook according to the configuration of the network equipment.

Optionally, the candidate transmission occasion corresponds to one or more serving cells. That is, the higher layer signalling index corresponding to the candidate transmission occasion corresponds to one or more serving cells. As described, multiple TRPs belong to different cells, so similarly, multiple higher layer signalling indexes can also correspond to different cells. For example, the candidate transmission occasion corresponds to the higher layer signalling index 0 and the higher layer signalling index 1, while the higher layer signalling index 0 corresponds to the serving cell 0 and the serving cell 1, and the higher layer signalling index 1 corresponds to the serving cell 2 and the serving cell 3. The transmission occasion corresponding to a higher layer signalling index on a serving cell can be classified as a transmission occasion set, and then the candidate transmission occasion may be composed of multiple transmission occasion sets. Different transmission occasion sets correspond to different higher layer signalling indexes, or different transmission occasion sets correspond to different serving cells, or different transmission occasion sets correspond to different higher layer signalling indexes and different serving cells. If all candidate transmission occasions are classified as a transmission occasion set, then the candidate transmission occasion is composed of a transmission occasion set. Optionally, the transmission occasion set in the embodiment of the application may also be classified according to other methods. For example, the candidate transmission occasions are randomly classified into at least one transmission occasion set.

The terminal equipment may determine the semi-static HARQ-ACK codebook according to the number of transmission occasions in each transmission occasion set in at least one transmission occasion set included in the candidate transmission occasions. For example, the number of transmission occasions in each transmission occasion set can be represented by $M_c^t$, where c represents the index of the serving cell, which can start from 0, and t represents the higher layer signalling index, which can also start from 0. The terminal equipment can determine the semi-static HARQ-ACK codebook according to all $M_c^t$.

Optionally, the terminal equipment may sort the feedback information in the semi-static HARQ-ACK codebook according to a certain rule. When the candidate transmission occasions include three types of transmission occasions, the terminal equipment can sort the feedback information corresponding to all the three transmission occasions according to a certain rule, or the terminal equipment can also directly place the feedback information corresponding to a certain type of transmission occasion altogether and sort the feedback information corresponding to the other two types of transmission occasion together according to a certain rule.

The rule on which the terminal equipment is based to sort the feedback information corresponding to at least some of the transmission occasions in the candidate transmission occasions is illustrated in the subsequent paragraphs. For the convenience of description, at least some of the transmission occasions in the candidate transmission occasions are referred to as the first transmission occasion.

Optionally, the terminal equipment may determine the order of the feedback information corresponding to the first transmission occasion in the semi-static HARQ-ACK codebook according to at least one of the order of the higher layer signalling index corresponding to each transmission occasion in the first transmission occasion, the order of the index of the serving cell corresponding to each transmission occasion in the first transmission occasion, and the order of each transmission occasion in the first transmission occasion. In other words, the order of the feedback information corresponding to the first transmission occasion is determined according to at least one of the order of the higher layer signalling index corresponding to the first transmission occasion, the order of the index of the serving cell corresponding to the first transmission occasion, and the order of the transmission occasion in the first transmission occasion.

For example, the terminal equipment may determine the order of the corresponding feedback information according to the order of the index corresponding to each transmission occasion in the first transmission occasion. If the first transmission occasion includes transmission occasion 0, transmission occasion 1, and transmission occasion 2, transmission occasion 0 corresponds to the higher layer signalling index, and transmission occasion 1 and transmission occasion 2 correspond to the higher layer signalling index 1. Since the value 0 of the higher layer signalling index 0 is less than the value 1 of the higher layer signalling index 1, the feedback information corresponding to transmission occasion 0 can be before the feedback information corresponding to transmission occasion 1 and transmission occasion 2, respectively, and alternatively the feedback information corresponding to transmission occasion 1 and transmission occasion 2 may be before the feedback occasion corresponding to transmission occasion 0. As for the order of the feedback information corresponding to transmission occasion 1 and the feedback information corresponding to transmission occasion 2, the terminal may self-determine the order, or it can also be determined according to other rules.

In another example, the terminal equipment may determine the order of the corresponding feedback information according to the order of the index of the serving cell corresponding to each transmission occasion in the first transmission occasion. If the first transmission occasion includes transmission occasion 0, transmission occasion 1, and transmission occasion 2, transmission occasion 0 and transmission occasion 1 correspond to serving cell 0, and transmission occasion 2 corresponds to serving cell 1. Since the value 0 of the index of serving cell 0 is less than the value 1 of the index of serving cell 1, the feedback information corresponding to transmission occasion 0 and transmission occasion 1 may be before the feedback information corresponding to transmission occasion 2, and alternatively the feedback information corresponding to transmission occasion 2 may be before the feedback information corresponding to transmission occasion 0 and transmission occasion 1.

In another example, the terminal equipment may also determine the order of the corresponding feedback information according to the order of each transmission occasion in the first transmission occasion. If the first transmission occasion includes transmission occasion 0, transmission occasion 1, and transmission occasion 2, and transmission occasion 2 is before transmission occasion 1 and transmission occasion 0, then the feedback information corresponding to transmission occasion 2 may be before the feedback information corresponding to transmission occasion 1 and transmission occasion 0, or the feedback information corresponding to transmission occasion 2 may be after the feedback information corresponding to transmission occasion 1 and transmission occasion 0.

In an implementable embodiment, the terminal equipment first sorts the feedback information corresponding to each transmission occasion in the first transmission occasion according to the order of the higher layer signalling index, then sorts the feedback information corresponding to each transmission occasion in the transmission occasion corresponding to the same higher layer signalling index according to the order of the index of the serving cell, and finally sorts the feedback information corresponding to each transmission occasion in the transmission occasions corresponding to the same serving cell according to the order of the transmission occasions. Specifically, the higher layer signalling index corresponding to the first transmission occasion includes the first higher layer signalling index and the second higher layer signalling index, the value of the first higher layer signalling index is less than the value of the second higher layer signalling index, and the feedback information corresponding to the transmission occasion corresponding to the first higher layer signalling index is before the feedback information corresponding to the transmission occasion corresponding to the second higher layer signalling index. Optionally, the serving cell corresponding to the transmission occasion corresponding to the first higher layer signalling index includes the first serving cell and the second serving cell, the value of the index of the first serving cell is less than the value of the index of the second serving cell, and the feedback information corresponding to the transmission occasion corresponding to the first serving cell is before the feedback information corresponding to the first transmission occasion corresponding to the second serving cell. Optionally, the transmission occasion corresponding to the first serving cell includes a second transmission occasion and a third transmission occasion, the second transmission occasion is before the third transmission occasion, and the feedback information corresponding to the second transmission occasion is before the feedback information corresponding to the third transmission occasion.

To facilitate understanding, the embodiment provides a specific processing procedure of the terminal equipment. In fact, to implement the order of the feedback information, the terminal equipment may also adopt other processing methods, which may not be iterated herein. This applies to the subsequent similar embodiments, which may not be illustrated one by one.

The embodiment has high compatibility with Rel-15, and the implementation complexity can be reduced.

In another implementable embodiment, the terminal equipment may first sort the feedback information corresponding to each transmission occasion in the first transmission occasion according to the order of the index of the serving cell, then sort the feedback information corresponding to each transmission occasion in the transmission occasion corresponding to the same serving cell according to the order of transmission occasion, and finally sort the feedback information corresponding to each transmission occasion in the transmission occasions on the same time domain resource according to the order of higher layer signalling index. Specifically, the serving cell corresponding to the first transmission occasion includes a first serving cell and a second serving cell, the value of the index of the first serving cell is less than the value of the index of the second serving cell, and the feedback information corresponding to the transmission occasion corresponding to the first serving cell is before the feedback information corresponding to the transmission occasion corresponding to the second serving cell. Optionally, the transmission occasion corresponding to the first serving cell includes a second transmission occasion and a third transmission occasion, the second transmission occasion is before the third transmission occasion, and the feedback information corresponding to the second transmission occasion is before the feedback information corresponding to the third transmission occasion. Optionally, the second transmission occasion includes a second transmission occasion corresponding to the first higher layer signalling index and a second transmission occasion corresponding to the second higher layer signalling index, the value of the first higher layer signalling index is less than the value of the second higher layer signalling index, and the feedback information corresponding to the second transmission occasion corresponding to the first higher layer signalling index is before the feedback information corresponding to the second transmission occasion corresponding to the second higher layer signalling index.

The embodiment can reduce the cost of HARQ feedback.

Optionally, the first transmission occasion may be all transmission occasions scheduled by DCI in the candidate transmission occasions, and the feedback information corresponding to the transmission occasion of the PDSCH scheduled by the SPS may be after the feedback information corresponding to the transmission occasion scheduled by the DCI. In this way, the complexity of the protocol can be simplified.

Similarly, in this manner, the feedback information corresponding to the transmission occasion of the PDSCH scheduled by the SPS in the candidate transmission occasions can also be sorted. Optionally, the terminal equipment may also sort the feedback information corresponding to the transmission occasion of the PDSCH scheduled by the SPS according to at least one of the order of the higher layer signalling index, the order of the transmission occasion, and the order of the index of the serving cell.

In an implementable embodiment, the order of the feedback information corresponding to the transmission occasion of the PDSCH scheduled by the SPS is determined according to the order of the higher layer signalling index corresponding to the transmission occasion of the PDSCH scheduled by the SPS. Optionally, the higher layer signalling index corresponding to the transmission occasion of the PDSCH scheduled by the SSPS includes a third high layer signalling index and a fourth higher layer signalling index, and the value of the third higher layer signalling index is less than the value of the fourth higher layer signalling index; the feedback information corresponding to the transmission occasion of the PDSCH scheduled by SPS corresponding to the third higher layer signalling index is before the feedback information corresponding to the transmission occasion of the the PDSCH scheduled by SPS corresponding to the fourth higher layer signalling index, or the feedback information corresponding to the transmission occasion of the PDSCH scheduled by the SPS corresponding to the third higher layer signalling index is after the feedback information corresponding to the transmission occasion of the PDSCH scheduled by the SPS corresponding to the fourth higher layer signalling index.

The effect of the embodiment is to facilitate network-side processing and reduce network-side complexity.

In another implementable embodiment, the order of the feedback information corresponding to the transmission occasion of the PDSCH scheduled by the SPS is determined according to the order of the transmission occasion of each PDSCH scheduled by the SPS. Optionally, the transmission occasion of the PDSCH scheduled by the SPS includes a fourth transmission occasion and a fifth transmission occasion, and the fourth transmission occasion is before the fifth transmission occasion; the feedback information corresponding to the fourth transmission occasion is before the feedback information corresponding to the fifth transmission occasion, or the feedback information corresponding to the fourth transmission occasion is after the feedback information corresponding to the fifth transmission occasion.

The effect of the embodiment is to facilitate terminal processing and reduce terminal complexity.

In another implementable embodiment, the transmission occasion of the PDSCH scheduled by the SPS includes transmission occasions corresponding to multiple SPS configurations, and the order of the feedback information corresponding to the transmission occasion of the PDSCH scheduled by the SPS is determined according to the identifiers of the multiple SPS configurations or the positions of the multiple SPS configurations in the signaling used to carry the multiple SPS configurations. Optionally, the multiple SPS configurations include a first SPS configuration and a second SPS configuration; the value of the identifier of the first SPS configuration is less than the value of the identifier of the second SPS configuration, the feedback information corresponding to the transmission occasion corresponding to the first SPS configuration is before the feedback information corresponding to the transmission occasion corresponding to the second SPS configuration, or the feedback information corresponding to the transmission occasion corresponding to the first SPS configuration is after the feedback information corresponding to the transmission occasion corresponding to the second SPS configuration. Alternatively, the position of the first SPS configuration is before the position of the second SPS configuration, the feedback information corresponding to the transmission occasion corresponding to the first SPS configuration is before the feedback information corresponding to the transmission occasion corresponding to the second SPS configuration, or the position of the first SPS configuration is before the position of the second SPS configuration, the feedback information corresponding to the transmission occasion corresponding to the first SPS configuration is after the feedback information corresponding to the transmission occasion corresponding to the second SPS configuration.

Note that the various sorting methods are only for illustration, and the embodiments of the application are not limited thereto.

Optionally, the first transmission occasion may be all transmission occasions in the candidate transmission occasions. The transmission occasion of the PDSCH scheduled by the SPS, the transmission occasion of the PDSCH scheduled by the DCI, and the transmission occasion corresponding to the SPS PDSCH deactivation information scheduled by the DCI are processed in a unified manner, which can reduce network complexity.

Optionally, in the embodiment of the application, the higher layer signalling index corresponding to the transmission occasion of the PDSCH scheduled by the SPS in the first transmission occasion is the higher layer signalling index corresponding to the control resource set (CORESET) used to carry the SPS PDSCH activation information scheduled by the corresponding DCI. Specifically, the SPS PDSCH activation information is carried by DCI, and the DCI is carried in the CORESET.

Optionally, in the embodiment of the application, the higher layer signalling index corresponding to the transmission occasion scheduled by the DCI in the first transmission occasion is the higher layer signalling index corresponding to the control resource set (CORESET) used to carry the corresponding DCI.

Optionally, in the embodiment of the application, the order of the feedback information corresponding to all the transmission occasions of the PDSCH scheduled by the SPS in the first transmission occasion in the semi-static HARQ-ACK codebook is processed according to the corresponding same higher layer signalling index. Because the PDSCH scheduled by the SPS lasts for a period of time after activation, if all the feedback information corresponding to the transmission occasion of the PDSCH scheduled by the SPS is processed in a unified manner according to the corresponding same higher layer signalling index (it can be understood as being placed in the same TRP), the terminal does not need to remember which higher layer signalling index (or which TRP sends signals) each SPS PDSCH activation information corresponds to, thereby reducing the complexity of the terminal. For example, the feedback information corresponding to all transmission occasions of the PDSCH scheduled by the SPS can be corresponded to the higher layer signalling index with the smallest value or that with the largest value in the higher layer signalling index used by the semi-static HARQ-ACK codebook.

That is, even if all the transmission occasions of the PDSCH scheduled by the SPS corresponds to different higher layer signalling indexes, the corresponding feedback information is sorted after corresponding to the same higher layer signalling index.

Optionally, in the embodiment of the application, multiple transmission occasion sets included in the candidate transmission occasion may be determined according to multiple interval parameter sets. The multiple interval parameter sets are used to indicate the time domain interval between downlink data and the feedback information corresponding to higher layer signalling index on the serving cell corresponding to the corresponding transmission occasion set. Optionally, the multiple interval parameter sets may be specified by the protocol or configured by the network, for example, configured by the parameter dl-DataToUL-ACK. Optionally, different higher layer signalling indexes may correspond to different interval parameter sets. The higher layer signalling indexes can also correspond to the same interval parameter set.

Optionally, in the embodiment of the application, multiple transmission occasion sets included in the candidate transmission occasion may be determined according to multiple downlink data time domain allocation information sets. The downlink data time domain allocation information sets are used to indicate the time domain information of the transmission occasion corresponding to the corresponding higher layer signalling index on the corresponding serving cell. Optionally, the multiple downlink data time domain allocation information sets may be configured by the network, for example, configured by the parameter pdsch-TimeDomain-AllocationList. Optionally, different higher layer signalling indexes may correspond to different downlink data time domain allocation information sets. Different higher layer signalling indexes may also correspond to the same downlink data time domain allocation information set.

Optionally, if one transmission block at the most is transmitted on each transmission occasion of the PDSCH scheduled by the DCI, the feedback information corresponding to each transmission occasion of the PDSCH scheduled by the DCI includes one bit. Optionally, if the terminal equipment is configured to transmit a transmission block at the most, the feedback information corresponding to each transmission occasion in the candidate transmission occasions includes one bit. Optionally, if the terminal equipment is configured to transmit multiple transmission blocks at the most and the HARQ feedback supports spatial bundling, the feedback information corresponding to each transmission occasion in the candidate transmission occasions includes one bit, the value on the one bit is the value of the AND operation on the feedback information corresponding to the multiple transmission blocks, or the value on the one bit is a value of other operations on the feedback information corresponding to the multiple transmission blocks, such as an OR operation. Typically, the terminal equipment is configured to transmit two transmission blocks at the most. Optionally, if the terminal equipment is configured to transmit multiple transmission blocks at the most and the HARQ feedback does not support spatial bundling, the feedback information corresponding to each transmission occasion in the candidate transmission occasions includes multiple bits. The multiple bits respectively correspond to the multiple transmission blocks. Typically, the terminal equipment is configured to transmit two transmission blocks at the most.

The technical solution of the application may be illustrated in detail in the subsequent paragraphs in conjunction with several specific embodiments. Note that for the convenience of description, the embodiments below adopt a specific terminal equipment processing procedure to introduce the solution, for example, consider first, then consider . . . and other procedures. In fact, to implement the order of the feedback information in the embodiments below, the terminal equipment may also adopt other processing methods, which may not be iterated herein.

As shown in FIG. 3, first the transmission occasion scheduled by the DCI corresponding to the higher layer signalling index 0 on the serving cell 0 is considered, then the transmission occasion scheduled by the DCI corresponding to the higher layer signalling index 0 on the serving cell 1 is considered, then the transmission occasion scheduled by the DCI corresponding to the higher layer signalling index 1 on the serving cell 0 is considered, the transmission occasion scheduled by the DCI corresponding to the higher layer signalling index 1 on the serving cell 1 is further considered, and finally the transmission occasion of the PDSCH scheduled by SPS is considered altogether. The order of the transmission occasions of the PDSCH scheduled by the SPS may correspond to the order of the transmission occasions or may correspond to the order of the higher layer signalling index.

Figure 4:
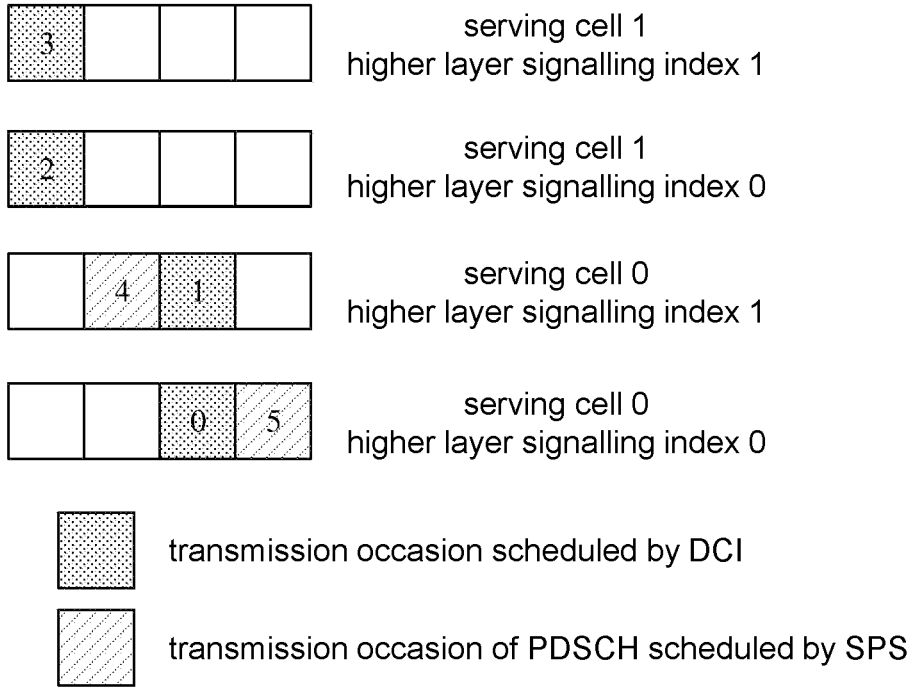
FIG. 4 is a schematic view illustrating an order of feedback information in a semi-static HARQ-ACK codebook according to an embodiment of the application.

As shown in FIG. 4, the transmission occasion scheduled by the DCI corresponding to serving cell 0 can be considered first. The first effective transmission occasion is in the third block. Meanwhile, the first two transmission occasions can be determined according to the higher layer signalling index 0 and the higher layer signalling index 1 respectively; the transmission occasion scheduled by the DCI corresponding to serving cell 1 is then considered. The first effective transmission occasion is in the first block. Meanwhile, the next two transmission occasions are respectively determined according to the higher layer signalling index 0 and the higher layer signalling index 1, and finally the transmission occasion of the PDSCH scheduled by SPS is considered in a unified manner. The order of the transmission occasion of the PDSCH scheduled by the SPS is determined according to the order of the transmission occasion.

Figure 5:
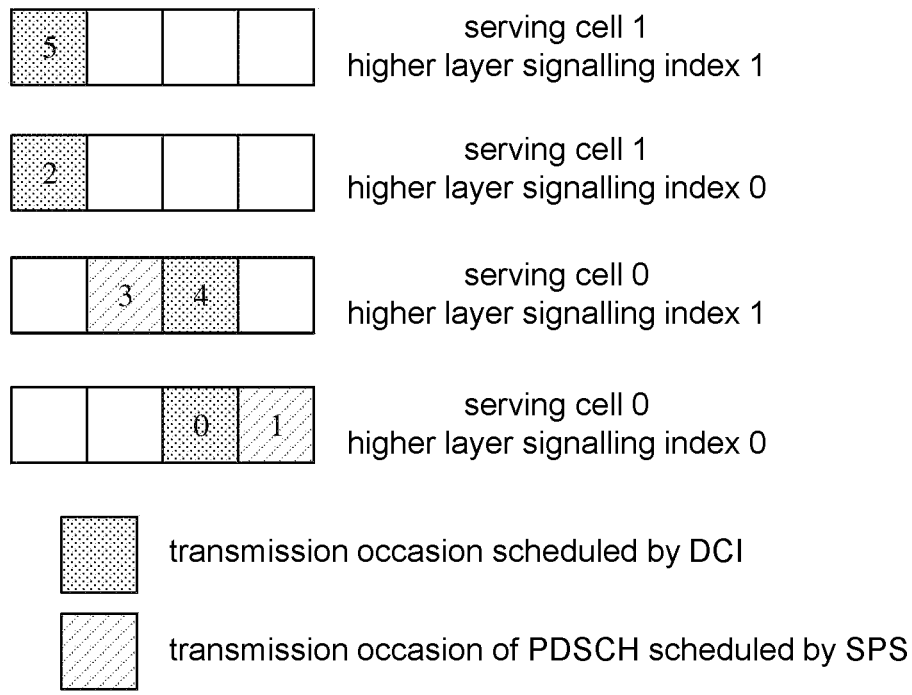
FIG. 5 is a schematic view illustrating an order of feedback information in a semi-static HARQ-ACK codebook according to an embodiment of the application.

As shown in FIG. 5, the candidate transmission occasion (including the transmission occasion scheduled by the DCI and the transmission occasion of the PDSCH scheduled by the SPS) corresponding to the higher layer signalling index 0 on the serving cell 0 can be considered first; the candidate transmission occasion (including the transmission occasion scheduled by the DCI and the transmission occasion of the PDSCH scheduled by the SPS) corresponding to the higher layer signalling index 0 on the serving cell 1 is then considered; the candidate transmission occasion (including the transmission occasion scheduled by the DCI and the transmission occasion of the PDSCH scheduled by the SPS) corresponding to the higher layer signalling index 1 on the serving cell 0 is further considered; and finally the candidate transmission occasion (including the transmission occasion scheduled by the DCI and the transmission occasion of the PDSCH scheduled by the SPS) corresponding to the higher layer signalling index 1 on the serving cell 1 is considered.

Figure 6:
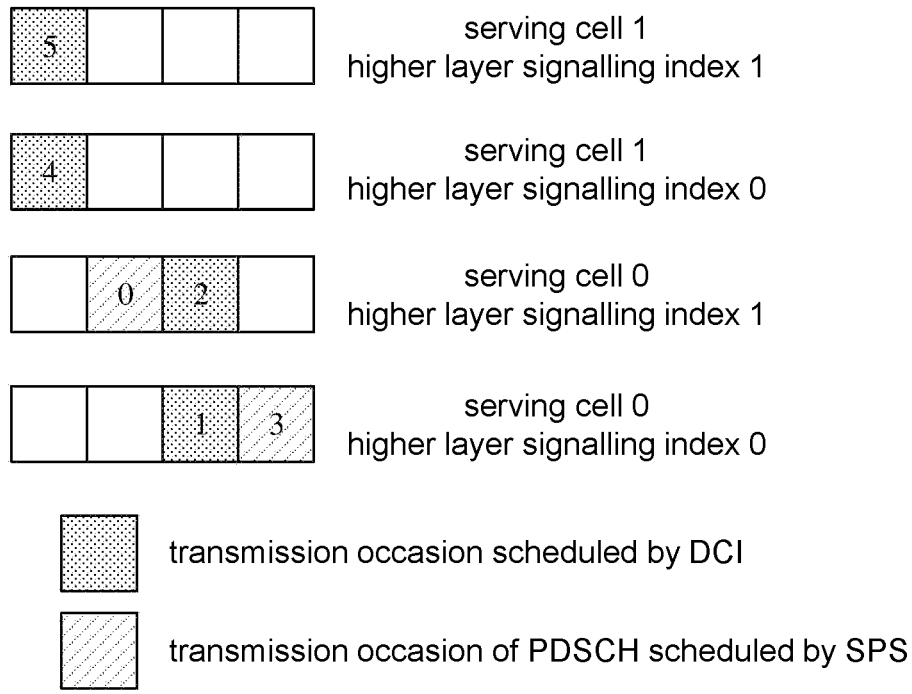
FIG. 6 is a schematic view illustrating an order of feedback information in a semi-static HARQ-ACK codebook according to an embodiment of the application.

As shown in FIG. 6, first the candidate transmission occasion (including the transmission occasion scheduled by the DCI and the transmission occasion of PDSCH scheduled by SPS) corresponding to serving cell 0 is considered. The first effective transmission occasion is in the second block, and there is only the transmission occasion corresponding to higher layer signalling index 1; the second effective transmission occasion is in the third block, and there are the transmission occasions corresponding to the higher layer signalling index 0 and the higher layer signalling index 1; the transmission occasion (including the transmission occasion scheduled by the DCI and the transmission occasion of PDSCH scheduled by SPS) corresponding to serving cell 1 is then considered. The first effective transmission occasion is in the first block, and there are two transmission occasions corresponding to the higher layer signalling index 0 and the higher layer signalling index 1, respectively.

Figure 7:
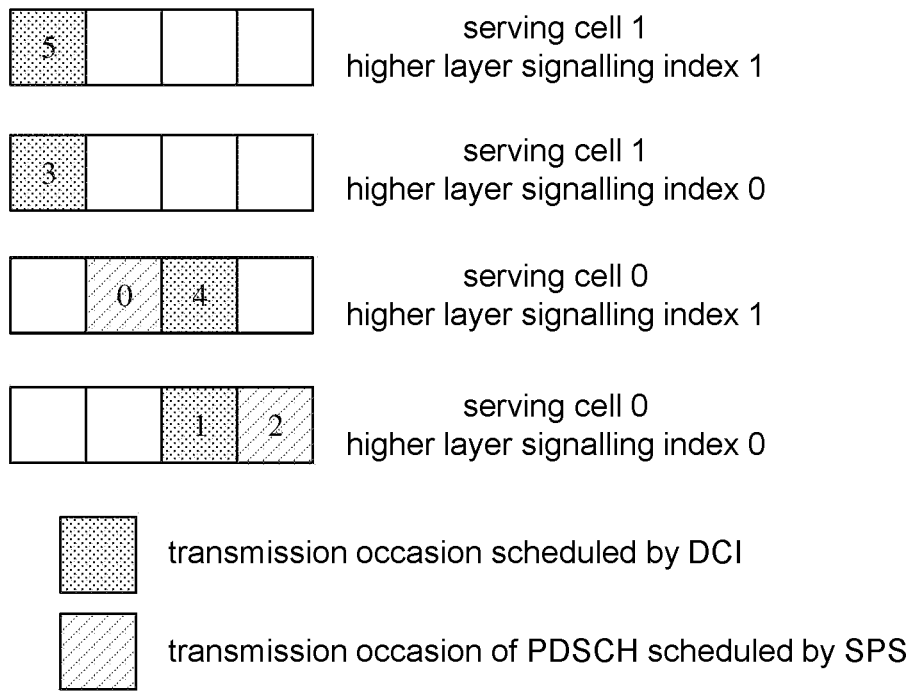
FIG. 7 is a schematic view illustrating an order of feedback information in a semi-static HARQ-ACK codebook according to an embodiment of the application.

As shown in FIG. 7, the transmission occasion of the PDSCH scheduled by each SPS can be sorted according to the higher layer signalling index 0 and then subsequently sorted according to FIG. 5.

Figure 8:
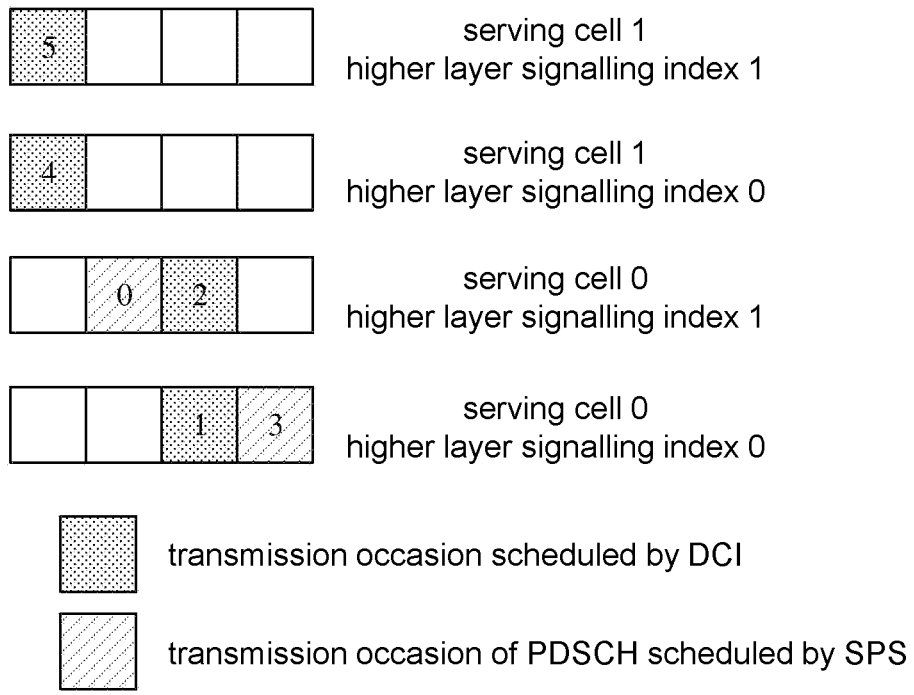
FIG. 8 is a schematic view illustrating an order of feedback information in a semi-static HARQ-ACK codebook according to an embodiment of the application.

As shown in FIG. 8, the transmission occasion of the PDSCH scheduled by each SPS can be sorted according to the higher layer signalling index 0 and then subsequently sorted according to FIG. 6.

It should be understood that the interaction, the related characteristics, functions, and the like between the network equipment and the terminal equipment described on the network side correspond to the related characteristics and functions of the terminal equipment. In addition, the related content has been illustrated in detail in the method 200, which is not iterated herein for the sake of conciseness.

It should also be understood that in the various embodiments of the application, the number of the order of the processes does not represent the order of execution. The execution order of each process should be determined by its function and internal logic, and the implementation process of the embodiments of the application is not limited thereto.

The method for transmitting data according to the embodiments of the application is illustrated in detail. The HARQ feedback device according to the embodiments of the application may be illustrated in the subsequent paragraphs with reference to FIG. 9 to FIG. 10. The technical features illustrated in the method embodiments are applicable to the device embodiments as follows.

Figure 9:
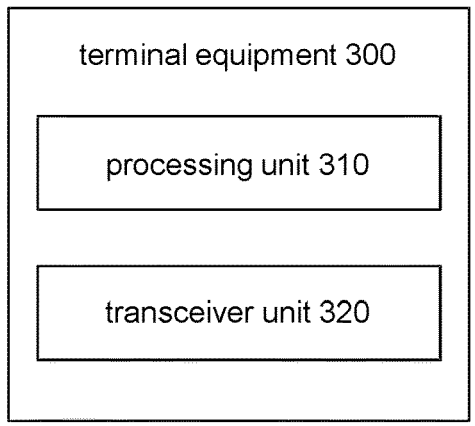
FIG. 9 is a schematic block view of terminal equipment according to an embodiment of the application.

FIG. 9 is a schematic block view of a terminal equipment 300 according to an embodiment of the application. As shown in FIG. 9, the terminal equipment 300 includes: a processing unit 310 configured to determine the HARQ-ACK codebook for semi-static hybrid automatic repeat request confirmation according to the candidate transmission occasion, where the semi-static HARQ-ACK codebook is used to indicate the feedback information corresponding to the candidate transmission occasion, the candidate transmission occasion includes the transmission occasion scheduled by the downlink control information (DCI) and/or the transmission occasion of the physical downlink shared channel (PDSCH) scheduled by the semi-persistent scheduling (SPS), and the transmission occasion scheduled by the DCI includes the transmission occasion of the PDSCH scheduled by the DCI and/or the transmission occasion corresponding to the SPS PDSCH deactivation information scheduled by the DCI; a transceiver unit 320 configured to perform HARQ feedback according to the semi-static HARQ-ACK codebook.

Optionally, in the embodiment of the application, the candidate transmission occasion corresponds to one or more higher layer signalling indexes, and/or the candidate transmission occasion corresponds to one or more serving cells.

Optionally, in the embodiment of the application, the candidate transmission occasion includes at least one transmission occasion set, and each transmission occasion set in the at least one transmission occasion set corresponds to a higher layer signalling index on a serving cell. Different transmission occasion sets correspond to different higher layer signalling indexes and/or different serving cells.

Optionally, in the embodiment of the application, the step of the terminal equipment determining the HARQ-ACK codebook according to the candidate transmission occasion includes the following step. The terminal equipment determines the semi-static HARQ-ACK codebook according to the number of transmission occasions in each transmission occasion set in at least one transmission occasion set included in the candidate transmission occasion.

Optionally, in the embodiment of the application, the order of the feedback information corresponding to the first transmission occasion is determined according to at least one of the order of the higher layer signalling index corresponding to the first transmission occasion, the order of the index of the serving cell corresponding to the first transmission occasion, and the order of the transmission occasion in the first transmission occasion, and the first transmission occasion is at least some of the transmission occasions in the candidate transmission occasions.

Optionally, in the embodiment of the application, the higher layer signalling index corresponding to the first transmission occasion includes the first higher layer signalling index and the second higher layer signalling index, the value of the first higher layer signalling index is less than the value of the second higher layer signalling index; the feedback information corresponding to the transmission occasion corresponding to the first higher layer signalling index is before the feedback information corresponding to the transmission occasion corresponding to the second higher layer signalling index, or the feedback information corresponding to the transmission occasion corresponding to the first higher layer signalling index is after the feedback information corresponding to the transmission occasion corresponding to the second higher layer signalling index.

Optionally, in the embodiment of the application, the serving cell corresponding to the transmission occasion corresponding to the first higher layer signalling index includes the first serving cell and the second serving cell, the value of the index of the first serving cell is less than the value of the index of the second serving cell; the feedback information corresponding to the transmission occasion corresponding to the first serving cell is before the feedback information corresponding to the transmission occasion corresponding to the second serving cell, or the feedback information corresponding to the transmission occasion corresponding to the first serving cell is after the feedback information corresponding to the transmission occasion corresponding to the second serving cell.

Optionally, in the embodiment of the application, the transmission occasion corresponding to the first serving cell includes a second transmission occasion and a third transmission occasion, and the second transmission occasion is before the third transmission occasion; the feedback information corresponding to the second transmission occasion is before the feedback information corresponding to the third transmission occasion, or the feedback information corresponding to the second transmission occasion is after the feedback information corresponding to the third transmission occasion.

Optionally, in the embodiment of the application, the serving cell corresponding to the first transmission occasion includes a first serving cell and a second serving cell, and the value of the index of the first serving cell is less than the value of the index of the second serving cell; the feedback information corresponding to the transmission occasion corresponding to the first serving cell is before the feedback information corresponding to the transmission occasion corresponding to the second serving cell, or the feedback information corresponding to the transmission occasion corresponding to the first serving cell is after the feedback information corresponding to the transmission occasion corresponding to the second serving cell.

Optionally, in the embodiment of the application, the transmission occasion corresponding to the first serving cell includes a second transmission occasion and a third transmission occasion, and the second transmission occasion is before the third transmission occasion; the feedback information corresponding to the second transmission occasion is before the feedback information corresponding to the third transmission occasion, or the feedback information corresponding to the second transmission occasion is after the feedback information corresponding to the third transmission occasion.

Optionally, in the embodiment of the application, the second transmission occasion includes a second transmission occasion corresponding to the first higher layer signalling index and a second transmission occasion corresponding to the second higher layer signalling index, and the value of the first higher layer signalling index is less than the value of the second higher layer signalling index; the feedback information corresponding to the second transmission occasion corresponding to the first higher layer signalling index is before the feedback information corresponding to the second transmission occasion corresponding to the second higher layer signalling index, or the feedback information corresponding to the second transmission occasion corresponding to the first higher layer signalling index is after the feedback information corresponding to the second transmission occasion corresponding to the second higher layer signalling index.

Optionally, in the embodiment of the application, the first transmission occasion is all transmission occasions scheduled by the DCI in the candidate transmission occasions, and the order of the feedback information indicated by the semi-static HARQ-ACK codebook is that the feedback information corresponding to the transmission occasion of the PDSCH scheduled by the SPS is after the feedback information corresponding to the transmission occasion scheduled by the DCI.

Optionally, in the embodiment of the application, the order of the feedback information corresponding to the transmission occasion of the PDSCH scheduled by the SPS is determined according to the order of the higher layer signalling index corresponding to the transmission occasion of the PDSCH scheduled by the SPS.

Optionally, in the embodiment of the application, the higher layer signalling index corresponding to the transmission occasion of the PDSCH scheduled by the SPS includes the third higher layer signalling index and the fourth higher layer signalling index, and the value of the third higher layer signalling index is less than the value of the fourth higher layer signalling index; the feedback information corresponding to the transmission occasion of the PDSCH scheduled by the SPS corresponding to the third higher layer signalling index is before the feedback information corresponding to the transmission occasion of the PDSCH scheduled by the SPS corresponding to the fourth higher layer signalling index, or the feedback information corresponding to the transmission occasion of the PDSCH scheduled by the SPS corresponding to the third higher layer signalling index is after the feedback corresponding to the transmission occasion of the PDSCH scheduled by the SPS corresponding to the fourth higher layer signalling index.

Optionally, in the embodiment of the application, the order of the feedback information corresponding to the transmission occasion of the PDSCH scheduled by the SPS is determined according to the order of the transmission occasion of the PDSCH scheduled by each SPS.

Optionally, in the embodiment of the application, the transmission occasion of the PDSCH scheduled by the SPS includes a fourth transmission occasion and a fifth transmission occasion, and the fourth transmission occasion is before the fifth transmission occasion; the feedback information corresponding to the fourth transmission occasion is before the feedback information corresponding to the fifth transmission occasion, or the feedback information corresponding to the fourth transmission occasion is after the feedback information corresponding to the fifth transmission occasion.

Optionally, in the embodiment of the application, the transmission occasion of the PDSCH scheduled by the SPS includes transmission occasions corresponding to multiple SPS configurations, and the order of the feedback information corresponding to the transmission occasion of the PDSCH scheduled by the SPS is determined according to the identifiers of the multiple SPS configurations or the positions of the multiple SPS configurations in the signaling used to carry the multiple SPS configurations.

Optionally, in the embodiment of the application, the multiple SPS configurations include the first SPS configuration and the second SPS configuration; the value of the identifier of the first SPS configuration is less than the value of the identifier of the second SPS configuration. The feedback information corresponding to the transmission occasion corresponding to the first SPS configuration is before the feedback information corresponding to the transmission occasion corresponding to the second SPS configuration, the feedback information corresponding to the transmission occasion corresponding to the first SPS configuration is after the feedback information corresponding to the transmission occasion corresponding to the second SPS configuration, the position of the first SPS configuration is before the position of the second SPS configuration, the feedback information corresponding to the transmission occasion corresponding to the first SPS configuration is before the feedback information corresponding to the transmission occasion corresponding to the second SPS configuration, or the position of the first SPS configuration is before the position of the second SPS configuration, and the feedback information corresponding to the transmission occasion corresponding to the first SPS configuration is after the feedback information corresponding to the transmission occasion corresponding to the second SPS configuration.

Optionally, in the embodiment of the application, the first transmission occasion is all transmission occasions in the candidate transmission occasions.

Optionally, in the embodiment of the application, the higher layer signalling index corresponding to the transmission occasion of the PDSCH scheduled by the SPS in the first transmission occasion is the higher layer signalling index corresponding to the control resource set (CORESET) used to carry the SPS PDSCH activation information scheduled by a corresponding DCI.

Optionally, in the embodiment of the application, the higher layer signalling index corresponding to the transmission occasion scheduled by the DCI in the first transmission occasion is the higher layer signalling index corresponding to the control resource set (CORESET) used to carry the corresponding DCI.

Optionally, in the embodiment of the application, the order of the feedback information corresponding to all the transmission occasions of the PDSCH scheduled by the SPS in the first transmission occasion in the semi-static HARQ-ACK codebook is processed according to the corresponding same higher layer signalling index.

Optionally, in the embodiment of the application, the processing unit is further configured to determine the multiple transmission occasion sets according to the multiple interval parameter sets, and the multiple interval parameter sets are used to indicate the time domain interval between the feedback information and the downlink data corresponding to the corresponding higher layer signalling index on the corresponding serving cell.

Optionally, in the embodiment of the application, different higher layer signalling indexes correspond to different interval parameter sets, or different higher layer signalling indexes correspond to the same interval parameter set.

Optionally, in the embodiment of the application, the processing unit is further configured to determine the multiple transmission occasion sets according to the downlink data time domain allocation information set, and the downlink data time domain allocation information set is used to indicate the time domain information of the transmission occasion corresponding to the corresponding higher layer signalling index on the corresponding serving cell.

Optionally, in the embodiment of the application, different higher layer signalling indexes correspond to different downlink data time domain allocation information sets, or different higher layer signalling indexes correspond to the same downlink data time domain allocation information set.

Optionally, in the embodiment of the application, if one transmission block is transmitted at the most for each transmission occasion of the PDSCH scheduled by the DCI, the feedback information corresponding to each transmission occasion of the PDSCH scheduled by the DCI includes one bit.

Optionally, in the embodiment of the application, if the terminal equipment is configured to transmit one transmission block at the most, the feedback information corresponding to each transmission occasion in the candidate transmission occasions includes one bit.

Optionally, in the embodiment of the application, if the terminal equipment is configured to transmit two transmission blocks at the most and the HARQ feedback does not support spatial bundling, the feedback information corresponding to each transmission occasion in the candidate transmission occasions includes two bits, and the two bits correspond to the two transmission blocks respectively.

Optionally, in the embodiment of the application, if the terminal equipment is configured to transmit two transmission blocks at the most and the HARQ feedback supports spatial bundling, the feedback information corresponding to each transmission occasion in the candidate transmission occasions includes one bit, and the value on the one bit is the value of the AND operation of the feedback information corresponding to the two transmission blocks.

Optionally, in the embodiment of the application, a higher layer signalling index corresponds to at least one control resource set (CORESET).

Optionally, in the embodiment of the application, a higher layer signalling index corresponds to a group of control resource sets (CORESET), or a higher layer signalling index is a group number of a group of control resource sets (CORESET).

Optionally, in the embodiment of the application, the higher layer signalling index is carried in the configuration signaling of the control resource set (CORESET).

Optionally, in the embodiment of the application, the transceiver unit is further configured to receive configuration information, where the configuration information is used to indicate that the type of the HARQ-ACK codebook is a semi-static HARQ-ACK codebook.

Optionally, in the embodiment of the application, the processing unit is further configured to generate an acknowledgment (ACK) corresponding to a specific transmission occasion if the terminal equipment detects the SPS PDSCH deactivation information scheduled by the DCI on the specific transmission occasion in the candidate transmission occasions or correctly receives the transmission block corresponding to the specific transmission occasion in the candidate transmission occasions; or the processing unit is further configured to generate a negative acknowledgement (NACK) corresponding to the specific transmission occasion if the terminal equipment does not correctly receive the transmission block corresponding to the specific transmission occasion in the candidate transmission occasions.

It should be understood that the terminal equipment 300 according to the embodiment of the application may correspond to the terminal equipment in the method embodiment of the application. In addition, the mentioned operations and/or functions and other operations and/or functions of each unit in the terminal equipment 300 are used to implement the corresponding process of the terminal equipment in the method of FIG. 2, which are not iterated herein for the sake of conciseness.

Figure 10:
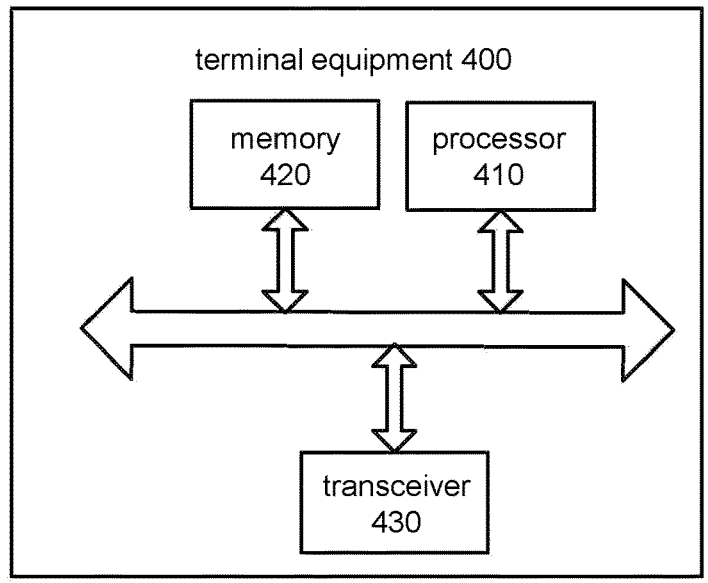
FIG. 10 is a schematic block view of terminal equipment according to an embodiment of the application.

FIG. 10 is a schematic structural view of a terminal equipment 400 according to an embodiment of the application. The terminal equipment 400 shown in FIG. 10 includes a processor 410, and the processor 410 can call and run a computer program from memory to implement the method in the embodiment of the application.

Optionally, as shown in FIG. 10, the terminal equipment 400 may further include memory 420. The processor 410 may call and run a computer program from the memory 420 to implement the method in the embodiment of the application.

The memory 420 may be a separate device independent of the processor 410 or may be integrated in the processor 410.

Optionally, as shown in FIG. 10, the terminal equipment 400 may further include a transceiver 430, the processor 410 may control the transceiver 430 to communicate with other devices, and the transceiver 430 specifically may send information or data to other devices or receive information or data sent by other devices.

The transceiver 430 may include a transmitter and a receiver. The transceiver 430 may further include an antenna, and the number of antennas may be one or more.

Figure 11:
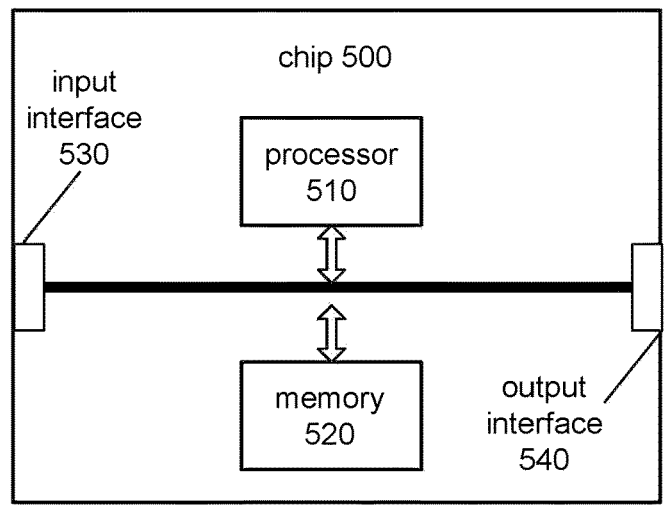
FIG. 11 is a schematic block view of a chip according to an embodiment of the application.

FIG. 11 is a schematic structural view of a chip according to an embodiment of the application. The chip 500 shown in FIG. 11 includes a processor 510, and the processor 510 can call and run a computer program from memory to implement the method in the embodiment of the application.

Optionally, as shown in FIG. 11, the chip 500 may further include memory 520. The processor 510 may call and run a computer program from the memory 520 to implement the method in the embodiment of the application.

The memory 520 may be a separate device independent of the processor 510 or may be integrated in the processor 510.

Optionally, the chip 500 may further include an input interface 530. The processor 510 can control the input interface 530 to communicate with other devices or chips, and the input interface 530 specifically can obtain information or data sent by other devices or chips.

Optionally, the chip 500 may further include an output interface 540. The processor 510 can control the output interface 540 to communicate with other devices or chips, and the output interface 540 specifically can output information or data to other devices or chips.

Optionally, the chip can be applied to the terminal equipment in the embodiment of the application, and the chip can implement the corresponding process implemented by the terminal equipment in each method of the embodiment of the application, which is not iterated herein for the sake of conciseness.

It should be understood that the chip mentioned in the embodiment of the application may also be referred to as a system-level chip, a system-on-chip, a system-on-a-chip, or a SoC, and the like.

It should be understood that the processor of the embodiment of the application may be an integrated circuit chip with signal processing capability. In the implementation, the steps of the method embodiments can be completed by hardware integrated logic circuits in the processor or instructions in the form of software. The processor may be a general-purpose processor, a digital signal processor (DSP), an application specific integrated circuit (ASIC), a field programmable gate array (FPGA), other programmable logic devices, discrete gates, transistor logic devices, or discrete hardware components. The processor can implement or execute the methods, steps, and logical block diagrams disclosed in the embodiments of the application. The general-purpose processor may be a microprocessor, or the processor may also be any conventional processor or the like. The steps of the method disclosed in the embodiments of the application may be directly embodied as being executed and completed by a hardware decoding processor or by a combination of hardware and software modules in the decoding processor. The software module can be located in a mature storage medium in the field, such as random access memory, flash memory, read-only memory, programmable read-only memory, electrically erasable programmable memory, or a register. The storage medium is located in the memory, and the processor reads the information in the memory and completes the steps of the method in combination with its hardware.

It can be understood that the memory in the embodiments of the application may be volatile memory or non-volatile memory or may include both volatile and non-volatile memory. The non-volatile memory can be read-only memory (ROM), programmable ROM (PROM), erasable PROM (EPROM), electrically EPROM (EEPROM), or flash memory. The volatile memory may be random access memory (RAM), which is used as an external cache. By an illustration but not restrictive description, many forms of RAM are available, such as static RAM (SRAM), dynamic RAM (DRAM), synchronous DRAM (SDRAM), double data rate SDRAM (DDR SDRAM), enhanced SDRAM (ESDRAM), synchlink DRAM (SLDRAM), and direct rambus RAM (DR RAM). Note that the memory of the systems and methods illustrated herein are intended to include, but are not limited to, the memory and any other suitable types of memory.

It should be understood that the memory is exemplary but not restrictive. For example, the memory in the embodiment of the application may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), and direct rambus RAM (DR RAM), and the like. That is, the memory of the systems and methods illustrated herein are intended to include, but are not limited to, the memory and any other suitable types of memory.

The embodiments of the application also provide a computer-readable storage medium for storing computer programs.

Optionally, the computer-readable storage medium may be applied to the network equipment in the embodiments of the application, and the computer program enables the computer to execute the corresponding process implemented by the network equipment in each method of the embodiment of the application, which is not iterated herein for the sake of conciseness.

Optionally, the computer-readable storage medium may be applied to the terminal equipment in the embodiments of the application, and the computer program enables the computer to execute the corresponding process implemented by the mobile terminal/terminal equipment in each method of the embodiment of the application, which is not iterated herein for the sake of conciseness.

The embodiments of the application also provide a computer program product, including computer program instructions.

Optionally, the computer program product may be applied to the network equipment in the embodiments of the application, and the computer program instructions enable the computer to execute the corresponding process implemented by the network equipment in each method of the embodiment of the application, which is not iterated herein for the sake of conciseness.

Optionally, the computer program product may be applied to the terminal equipment in the embodiments of the application, and the computer program instructions enable the computer to execute the corresponding process implemented by the mobile terminal/terminal equipment in each method of the embodiment of the application, which is not iterated herein for the sake of conciseness.

The embodiments of the application also provide a computer program.

Optionally, the computer program may be applied to the network equipment in the embodiments of the application. When the computer program runs on the computer, the computer is enabled to execute the corresponding process implemented by the network equipment in each method of the embodiment of the application, which is not iterated herein for the sake of conciseness.

Optionally, the computer program may be applied to the terminal equipment in the embodiments of the application. When the computer program runs on the computer, the computer is enabled to execute the corresponding process implemented by the terminal equipment in each method of the embodiment of the application, which is not iterated herein for the sake of conciseness.

A person of ordinary skill in the art may realize that the units and algorithm steps of the illustrated examples in combination with the embodiments disclosed herein can be implemented by electronic hardware or a combination of computer software and electronic hardware. Whether the functions are executed by hardware or software depends on the specific application and design constraint conditions of the technical solution. Professionals and technicians can use different methods for each specific application to implement the described functions, but such implementation should not be considered beyond the scope of this application.

Those skilled in the art can clearly understand that, for the convenience and conciseness of description, the specific working process of the illustrated system, device, and unit can refer to the corresponding process in the method embodiments, which is not repeated herein.

In the embodiments provided in the application, it should be understood that the disclosed system, device, and method may be implemented in other ways. For example, the illustrated device embodiments are only illustrative. For example, the division of the unit is only a logical function division, and there may be other division methods in actual implementation. For example, multiple units or components can be combined or integrated into another system, or some features can be omitted or not implemented. In addition, the displayed or discussed mutual coupling or direct coupling or communication connection may be indirect coupling or communication connection through some interfaces, devices, or units and may be in electrical, mechanical, or other forms.

The units described as separate components may or may not be physically separated, and the components displayed as units may or may not be physical units, that is, they may be located in one place, or they may be distributed on multiple network units. Some or all of the units may be selected according to actual needs to achieve the objectives of the solutions of the embodiments.

In addition, each functional unit in the various embodiments of the application may be integrated into one processing unit, each unit may be physically disposed separately, or two or more units may be integrated into one unit.

If the function is implemented in the form of a software functional unit and sold or used as an independent product, the functional unit can be stored in a computer readable storage medium. Accordingly, the technical solution of the application in essence, part of the technical solution that contributes to the current technology, or part of the technical solution can be embodied in the form of a software product, and the computer software product is stored in a storage medium and includes several instructions for enabling a computer device (which may be a personal computer, a server, a network equipment, and the like) to execute all or part of the steps of the methods illustrated in the various embodiments of the application. The storage media include media, such as USB flash drives, mobile hard disks, read-only memory (ROM), random access memory (RAM), disks, compact disks, and other media that can store program codes.

The above are only specific implementations of the application, and the protection scope of the application is not limited thereto. All changes or replacements within the technical scope disclosed in the application that those persons skilled in the art can easily conceive should be covered within the protection scope of the application. Therefore, the protection scope of the application shall be subject to the protection scope of the claims.

What is claimed is:

1. A method for hybrid automatic repeat (HARQ) feedback, comprising:
   determining, through terminal equipment, a semi-static hybrid automatic repeat request acknowledgement (HARQ-ACK) codebook according to a candidate transmission occasion, wherein the semi-static HARQ-ACK codebook is used to indicate feedback information corresponding to the candidate transmission occasion, the candidate transmission occasion comprises a transmission occasion scheduled by a downlink control information (DCI) and/or a transmission occasion of a physical downlink shared channel (PDSCH) scheduled by a semi-persistent scheduling (SPS), the transmission occasion scheduled by the DCI comprises a transmission occasion of a PDSCH scheduled by the DCI and/or a transmission occasion corresponding to SPS PDSCH deactivation information scheduled by the DCI;
   performing, through the terminal equipment, HARQ feedback according to the semi-static HARQ-ACK codebook, wherein
   an order of feedback information corresponding to a first transmission occasion in the semi-static HARQ-ACK codebook is determined according to at least one of an order of a higher layer signalling index corresponding to the first transmission occasion, an order of an index of a serving cell corresponding to the first transmission occasion, an order of transmission occasions in the first transmission occasion, the first transmission occasion is at least part of transmission occasions in the candidate transmission occasion,
   the higher layer signalling index corresponding to the first transmission occasion comprises a first higher layer signalling index and a second higher layer signalling index, the first higher layer signalling index corresponds to at least one first control resource set (CORESET), the second higher layer signalling index corresponds to at least one second CORESET, and a value of the first higher layer signalling index is less than a value of the second higher layer signalling index;
   feedback information corresponding to a transmission occasion corresponding to the first higher layer signalling index is before feedback information corresponding to a transmission occasion corresponding to the second higher layer signalling index, or
   the feedback information corresponding to the transmission occasion corresponding to the first higher layer signalling index is after the feedback information corresponding to the transmission occasion corresponding to the second higher layer signalling index;
   a serving cell corresponding to the transmission occasion corresponding to the first higher layer signalling index comprises a first serving cell and a second serving cell, and a value of an index of the first serving cell is less than a value of an index of the second serving cell;
   feedback information corresponding to a transmission occasion corresponding to the first serving cell is before feedback information corresponding to a transmission occasion corresponding to the second serving cell, or
   the feedback information corresponding to the transmission occasion corresponding to the first serving cell is after the feedback information corresponding to the transmission occasion corresponding to the second serving cell.

2. The method according to claim 1, wherein the candidate transmission occasion corresponds to one or more higher layer signalling indexes, and/or the candidate transmission occasion corresponds to one or more serving cells.

3. The method according to claim 1, wherein the candidate transmission occasion comprises at least one transmission occasion set, each transmission occasion set in the at least one transmission occasion set corresponds to a higher layer signalling index on a serving cell, and different transmission occasion sets correspond to different higher layer signalling indexes and/or different serving cells.

4. The method according to claim 1, wherein determining the HARQ-ACK codebook trough the terminal equipment according to the candidate transmission occasion comprises:
determining, through the terminal equipment, the semi-static HARQ-ACK codebook according to a number of transmission occasions in each transmission occasion set in the at least one transmission occasion set comprised in the candidate transmission occasion.

5. The method according to claim 1, wherein the transmission occasion corresponding to the first serving cell comprises a second transmission occasion and a third transmission occasion, and the second transmission occasion is before the third transmission occasion;
feedback information corresponding to the second transmission occasion is before feedback information corresponding to the third transmission occasion, or
the feedback information corresponding to the second transmission occasion is after the feedback information corresponding to the third transmission occasion.

6. The method according to claim 1, wherein the first transmission occasion is all the transmission occasions scheduled by the DCI in the candidate transmission occasion, an order of feedback information indicated by the semi-static HARQ-ACK codebook is that feedback information corresponding to a transmission occasion of the PDSCH scheduled by the SPS is after the feedback information corresponding to the transmission occasion scheduled by the DCI.

7. The method according to claim 1, wherein a higher layer signalling index corresponding to the transmission occasion of the PDSCH scheduled by the SPS in the first transmission occasion is a higher layer signalling index corresponding to a control resource set (CORESET) used to carry SPS PDSCH activation information scheduled by a corresponding DCI.

8. A computer-readable storage medium, configured to store a computer program, wherein the computer program enables a computer to execute the method according to claim 1.

9. A terminal equipment, comprising:
a processor, configured to determine a semi-static hybrid automatic repeat request acknowledgement (HARQ-ACK) codebook according to a candidate transmission occasion, wherein the semi-static HARQ-ACK codebook is used to indicate the feedback information corresponding to the candidate transmission occasion, the candidate transmission occasion comprises a transmission occasion scheduled by a downlink control information (DCI) and/or a transmission occasion of a physical downlink shared channel (PDSCH) scheduled by a semi-persistent scheduling (SPS), and the transmission occasion scheduled by the DCI comprises a transmission occasion of the PDSCH scheduled by the DCI and/or a transmission occasion corresponding to SPS PDSCH deactivation information scheduled by the DCI;
a transceiver, configured to perform HARQ feedback according to the semi-static HARQ-ACK codebook, wherein
an order of feedback information corresponding to a first transmission occasion in the semi-static HARQ-ACK codebook is determined according to at least one of an order of a higher layer signalling index corresponding to the first transmission occasion, an order of an index of a serving cell corresponding to the first transmission occasion, an order of transmission occasions in the first transmission occasion, and the first transmission occasion is at least part of transmission occasions in the candidate transmission occasion,
the higher layer signalling index corresponding to the first transmission occasion comprises a first higher layer signalling index and a second higher layer signalling index, the first higher layer signalling index corresponds to at least one first control resource set (CORESET), the second higher layer signalling index corresponds to at least one second CORESET, and a value of the first higher layer signalling index is less than a value of the second higher layer signalling index;
feedback information corresponding to a transmission occasion corresponding to the first higher layer signalling index is before feedback information corresponding to a transmission occasion corresponding to the second higher layer signalling index, or
the feedback information corresponding to the transmission occasion corresponding to the first higher layer signalling index is after the feedback information corresponding to the transmission occasion corresponding to the second higher layer signalling index;
a serving cell corresponding to the transmission occasion corresponding to the first higher layer signalling index comprises a first serving cell and a second serving cell, and a value of an index of the first serving cell is less than a value of an index of the second serving cell;
feedback information corresponding to a transmission occasion corresponding to the first serving cell is before feedback information corresponding to a transmission occasion corresponding to the second serving cell, or
the feedback information corresponding to the transmission occasion corresponding to the first serving cell is after the feedback information corresponding to the transmission occasion corresponding to the second serving cell.

10. The terminal equipment according to claim 9, wherein the candidate transmission occasion corresponds to one or more higher layer signalling indexes, and/or the candidate transmission occasion corresponds to one or more serving cells.

11. The terminal equipment according to claim 9, wherein the candidate transmission occasion comprises at least one transmission occasion set, each transmission occasion set in the at least one transmission occasion set corresponds to a higher layer signalling index on a serving cell, and different transmission occasion sets correspond to different higher layer signalling indexes and/or different serving cells.

12. The terminal equipment according to claim 9, wherein determining the HARQ-ACK codebook trough the terminal equipment according to the candidate transmission occasion comprises:
determining, through the terminal equipment, the semi-static HARQ-ACK codebook according to a number of transmission occasions in each transmission occasion set in the at least one transmission occasion set comprised in the candidate transmission occasion.

13. The terminal equipment according to claim 9, wherein the transmission occasion corresponding to the first serving cell comprises a second transmission occasion and a third transmission occasion, and the second transmission occasion is before the third transmission occasion;

feedback information corresponding to the second transmission occasion is before feedback information corresponding to the third transmission occasion, or the feedback information corresponding to the second transmission occasion is after the feedback information corresponding to the third transmission occasion.

14. The terminal equipment according to claim 9, wherein the first transmission occasion is all the transmission occasions scheduled by the DCI in the candidate transmission occasion, an order of feedback information indicated by the semi-static HARQ-ACK codebook is that feedback information corresponding to a transmission occasion of the PDSCH scheduled by the SPS is after the feedback information corresponding to the transmission occasion scheduled by the DCI.

* * * * *